US012265787B2

(12) United States Patent
Sales et al.

(10) Patent No.: US 12,265,787 B2
(45) Date of Patent: Apr. 1, 2025

(54) DOCUMENT DIFFERENCE VIEWING AND NAVIGATION

(71) Applicant: Everlaw, Inc., Oakland, CA (US)

(72) Inventors: Mark Sales, Castro Valley, CA (US);
Esther Kwak, Sunnyvale, CA (US);
Kevin Kraftsmith, Oakland, CA (US);
Leo Chen, San Jose, CA (US)

(73) Assignee: Everlaw, Inc., Oakland, CA (US)

( * ) Notice: Subject to any disclaimer, the term of this patent is extended or adjusted under 35 U.S.C. 154(b) by 0 days.

(21) Appl. No.: 17/978,552

(22) Filed: Nov. 1, 2022

(65) Prior Publication Data

US 2024/0143911 A1     May 2, 2024

(51) Int. Cl.
*G06F 40/194*     (2020.01)
*G06F 3/0482*     (2013.01)
(Continued)

(52) U.S. Cl.
CPC .......... *G06F 40/194* (2020.01); *G06F 3/0482* (2013.01); *G06F 3/04842* (2013.01); *G06F 40/106* (2020.01); *G06F 40/117* (2020.01); *G06F 40/166* (2020.01); *G06F 40/197* (2020.01); *G06Q 50/18* (2013.01); *G06F 2203/04803* (2013.01)

(58) Field of Classification Search
CPC .... G06F 40/194; G06F 40/166; G06F 40/197; G06F 40/106; G06F 40/117
See application file for complete search history.

(56) References Cited

U.S. PATENT DOCUMENTS 6,604,103 B1 * 8/2003 Wolfe ................. G06F 16/93
707/999.005
6,757,678 B2 * 6/2004 Myllymaki ........... G06F 16/951
(Continued)

FOREIGN PATENT DOCUMENTS

EP     2711897 A1     3/2014

OTHER PUBLICATIONS

Derrick Moser, "Diffuse User's Manual", https://diffuse.sourceforge.net/manual.html#file-comparison, Jul. 18, 2014, 16 pages (Year: 2014).*

(Continued)

*Primary Examiner* — Benjamin Smith
(74) *Attorney, Agent, or Firm* — Banner & Witcoff, Ltd.

(57) ABSTRACT

Document difference viewing and navigation are disclosed that enables automatic comparison and easy viewing of the difference between many documents (e.g., four or more, dozens, hundreds, or thousands of documents) for, for example, document review processes. The system receives and reads a set of documents containing text. The system identifies shared text and differences by location within the shared text among different documents in the set of documents. It sorts the documents in the set of documents into groups of different text variation versions and generates a shared difference document. The shared difference document is displayed in a first panel of a user interface and displays shared text as static text and areas of difference in highlighted regions. When a user selects of a given area of difference, the text variations and a list of documents containing one or more corresponding text variations are displayed in a second panel.

20 Claims, 9 Drawing Sheets

(51) Int. Cl.
*G06F 3/04842* (2022.01)
*G06F 40/106* (2020.01)
*G06F 40/117* (2020.01)
*G06F 40/166* (2020.01)
*G06F 40/197* (2020.01)
*G06Q 50/18* (2012.01)

(56) References Cited

U.S. PATENT DOCUMENTS

| | | | | |
|---|---|---|---|---|
| 6,772,165 | B2* | 8/2004 | O'Carroll | G06F 40/143 |
| 7,519,949 | B2* | 4/2009 | Massaro | G06F 40/194 |
| | | | | 717/120 |
| 7,809,711 | B2* | 10/2010 | Alba | G06F 16/355 |
| | | | | 707/739 |
| 7,945,600 | B1* | 5/2011 | Thomas | G06F 16/353 |
| | | | | 707/804 |
| 8,095,876 | B1* | 1/2012 | Verstak | G06F 40/194 |
| | | | | 715/277 |
| 8,453,048 | B2* | 5/2013 | Holt | G06F 40/166 |
| | | | | 715/229 |
| 8,522,129 | B1* | 8/2013 | Verstak | G06F 40/194 |
| | | | | 715/713 |
| 8,527,523 | B1* | 9/2013 | Ravid | G06F 16/951 |
| | | | | 706/54 |
| 8,533,194 | B1* | 9/2013 | Ravid | G06N 20/10 |
| | | | | 707/736 |
| 8,706,742 | B1* | 4/2014 | Ravid | G06N 5/04 |
| | | | | 707/740 |
| 8,914,376 | B2* | 12/2014 | Ravid | G06F 16/353 |
| | | | | 707/742 |
| 9,092,434 | B2* | 7/2015 | Kumar | G06F 16/954 |
| 9,116,607 | B2* | 8/2015 | Hallock | G06F 3/0485 |
| 9,146,913 | B2* | 9/2015 | Gorbaty | G06Q 10/06 |
| 9,245,007 | B2* | 1/2016 | Joshi | G06F 16/334 |
| 9,262,390 | B2* | 2/2016 | Edala | G06F 40/284 |
| 9,275,129 | B2* | 3/2016 | Desai | G06F 16/31 |
| 9,514,103 | B2* | 12/2016 | Kletter | G06F 40/166 |
| 9,552,340 | B2* | 1/2017 | Marsh | G06F 40/194 |
| 9,569,406 | B2* | 2/2017 | Shaver | G06F 40/106 |
| 9,652,443 | B2* | 5/2017 | Holt | G06F 40/134 |
| 9,779,072 | B1 | 10/2017 | Verstak | G06F 16/219 |
| 9,785,833 | B1* | 10/2017 | Price | G06V 30/414 |
| 10,007,650 | B2* | 6/2018 | Edala | G06F 16/93 |
| 10,083,176 | B1* | 9/2018 | Desai | G06F 16/3347 |
| 10,242,261 | B1* | 3/2019 | Price | G06F 40/216 |
| 10,275,434 | B1* | 4/2019 | Verstak | G06F 16/1873 |
| 10,726,511 | B2* | 7/2020 | Girgensohn | G06Q 50/184 |
| 10,740,557 | B1* | 8/2020 | Rajpara | G06F 40/30 |
| 10,769,365 | B2* | 9/2020 | Fern | G06F 40/117 |
| 10,838,996 | B2* | 11/2020 | Agarwal | G06F 40/197 |
| 11,030,163 | B2* | 6/2021 | Glover | G06F 16/1873 |
| 11,227,107 | B2* | 1/2022 | Sanderson | G06F 40/197 |
| 11,250,211 | B2* | 2/2022 | Virmani | G06F 16/245 |
| 11,288,450 | B2* | 3/2022 | Rajpara | G06F 40/247 |
| 11,363,064 | B2* | 6/2022 | Thakur | H04L 63/1425 |
| 11,461,552 | B2* | 10/2022 | Han | G06V 30/19113 |
| 11,714,791 | B2* | 8/2023 | Religa | G06F 16/345 |
| | | | | 707/608 |
| 11,789,990 | B1* | 10/2023 | Fouad | G06F 16/35 |
| | | | | 707/736 |
| 11,853,369 | B2* | 12/2023 | Hamlin | G06Q 10/10 |
| 12,118,814 | B2* | 10/2024 | Neal | G06V 30/19013 |
| 2002/0188598 | A1* | 12/2002 | Myllymaki | G06F 16/9027 |
| 2003/0093755 | A1* | 5/2003 | O'Carroll | G06F 40/137 |
| | | | | 715/205 |
| 2004/0223648 | A1* | 11/2004 | Hoene | G06F 40/194 |
| | | | | 382/218 |
| 2004/0230952 | A1* | 11/2004 | Massaro | G06F 40/197 |
| | | | | 717/110 |
| 2007/0094244 | A1* | 4/2007 | Wolfe | G06F 16/93 |
| 2007/0106704 | A1* | 5/2007 | Wolfe | G06F 16/9574 |
| 2007/0282799 | A1* | 12/2007 | Alba | G06F 16/9535 |
| 2008/0235579 | A1 | 9/2008 | Champion et al. | |
| 2010/0030798 | A1* | 2/2010 | Kumar | G06F 16/954 |
| | | | | 707/805 |
| 2010/0077301 | A1* | 3/2010 | Bodnick | G06Q 30/02 |
| | | | | 715/274 |
| 2010/0250541 | A1* | 9/2010 | Richards | G06F 16/35 |
| | | | | 707/E17.014 |
| 2011/0029491 | A1* | 2/2011 | Joshi | G06F 16/334 |
| | | | | 707/E17.008 |
| 2011/0087668 | A1* | 4/2011 | Thomas | G06F 16/35 |
| | | | | 707/738 |
| 2011/0197121 | A1* | 8/2011 | Kletter | G06F 40/194 |
| | | | | 715/255 |
| 2011/0296288 | A1* | 12/2011 | Gorbaty | G06F 40/194 |
| | | | | 715/205 |
| 2012/0005156 | A1* | 1/2012 | Grant | G06F 40/197 |
| | | | | 707/769 |
| 2012/0060082 | A1* | 3/2012 | Edala | G06F 40/169 |
| | | | | 715/231 |
| 2012/0209853 | A1* | 8/2012 | Desai | G06F 16/3344 |
| | | | | 707/E17.014 |
| 2012/0233528 | A1* | 9/2012 | Holt | G06F 40/134 |
| | | | | 715/205 |
| 2012/0290982 | A1* | 11/2012 | Hallock | G06F 3/0485 |
| | | | | 715/828 |
| 2013/0254653 | A1* | 9/2013 | Holt | G06F 40/197 |
| | | | | 715/256 |
| 2013/0262420 | A1* | 10/2013 | Edelstein | G06F 40/197 |
| | | | | 707/695 |
| 2013/0297612 | A1* | 11/2013 | Ravid | G06F 16/3326 |
| | | | | 707/740 |
| 2014/0033088 | A1* | 1/2014 | Shaver | G06F 40/197 |
| | | | | 715/764 |
| 2014/0101526 | A1* | 4/2014 | Marsh | G06F 40/197 |
| | | | | 715/229 |
| 2015/0012528 | A1 | 1/2015 | Kapadia | |
| 2015/0066938 | A1* | 3/2015 | Ravid | G06N 20/00 |
| | | | | 707/738 |
| 2015/0178384 | A1* | 6/2015 | Richards | G06Q 30/02 |
| | | | | 707/737 |
| 2016/0055196 | A1* | 2/2016 | Collins | G06F 16/93 |
| | | | | 707/690 |
| 2016/0132479 | A1* | 5/2016 | Edala | G06F 16/93 |
| | | | | 715/230 |
| 2016/0188584 | A1* | 6/2016 | Glover | G06F 16/285 |
| | | | | 707/608 |
| 2017/0185574 | A1* | 6/2017 | Fern | G06F 40/117 |
| 2017/0300929 | A9* | 10/2017 | Richards | G06F 16/325 |
| 2019/0205400 | A1* | 7/2019 | Puzicha | H04L 51/18 |
| 2019/0286741 | A1* | 9/2019 | Agarwal | G06F 40/197 |
| 2019/0295200 | A1* | 9/2019 | Girgensohn | G06F 16/5846 |
| 2020/0272788 | A1* | 8/2020 | Sanderson | G06V 30/416 |
| 2020/0364401 | A1* | 11/2020 | Rajpara | G06F 40/30 |
| 2021/0014270 | A1* | 1/2021 | Thakur | H04L 63/1425 |
| 2021/0049235 | A1* | 2/2021 | Virmani | G06F 16/93 |
| 2021/0326310 | A1* | 10/2021 | Glover | G06F 16/23 |
| 2022/0004713 | A1* | 1/2022 | Han | G06V 30/413 |
| 2022/0164709 | A1* | 5/2022 | Johnson | G06N 7/01 |
| 2022/0230463 | A1* | 7/2022 | Neal | G06F 3/0483 |
| 2022/0382728 | A1* | 12/2022 | Religa | G06F 40/197 |
| 2023/0082729 | A1* | 3/2023 | Religa | G06F 40/169 |
| | | | | 715/230 |
| 2023/0135318 | A1* | 5/2023 | Hamlin | G06F 16/93 |
| | | | | 707/694 |
| 2023/0139036 | A1* | 5/2023 | Hamlin | G06Q 10/10 |
| | | | | 706/50 |
| 2023/0350932 | A1* | 11/2023 | Fouad | G06V 30/416 |
| 2024/0143911 | A1* | 5/2024 | Sales | G06F 40/166 |

OTHER PUBLICATIONS

Bram Moolenaar, "Vim documentation: diff", https://vimdoc.sourceforge.net/htmldoc/diff.html#diff, Dec. 8, 2010, 9 pages (Year: 201).*

Steve Oualline, "The Vim book", https://www.truth.sk/vim/vimbook-OPL.pdf, 572 pages, Apr. 2001 (Year: 2001).*

(56) References Cited

OTHER PUBLICATIONS

Slawomir Duszynski et al., "N-way Diff: Set-based Comparison of Software Variants" 2020 Working Conference on Software Visualization (Vissoft), DOI 10.1109/VISSOFT51673.2020.00012; 12 pages, 2020 (Year: 2020).*
Jan. 29, 2024—(WO) International Search Report and Written Opinion—App PCT/US2023/036412.

* cited by examiner

FIG. 1A

View 100a

Second Panel 104 | 102 First Panel

Compare #261894.1 near duplicates [Return to review window]
27 near duplicates with 32 total difference areas Selected difference area [Difference area 1 of 32 ▾]

☐ Text variations ▾  2 of 4 ◇

☐ 3-06-2001
 12 documents ▲ — Text Variation 112a

☐ 4-09-2001
 9 documents ▲ — Text Variation 112b

☐ 3-08-2002
 4 documents ▲ — Text Variation 112c

☐ 5-08-2001
 2 documents ▲ — Text Variation 112d

[Modify 0 of 27 documents]

---

Shared Difference Document 106 — Shared Text Area 108

Contextual difference areas [#261894.1 (Reference document) ▾]

Difference Text Area 110a
DRAFT [4-09-2001] FOR DISCUSSION PURPOSES ONLY — Difference Text Area 110b
MARCH __, 2002 Delta Power Company LLC 89

Delta Power Company LLC 89 Headquarters Plaza North Tower, 14th Floor
Morristown, New Jersey 07960 Re: Newco, LLC Letter Agreement for Purchase of Membership Interests
Gentlemen:
This letter (the .Agreement.), when executed by the parties, Enron North America Corp.
(.ENA.)
and Delta Power Company LLC (.Delta.) (collectively, the .Parties. and
individually, a (.Party.), shall set
forth the agreement between the Parties.                                    Difference Text Area 110c 1. Purchase of Membership Interests. ENA is interested in causing the LLC to issue and
sell, and Delta is interested in acquiring, membership interest in [Newco,]
LLC, a Delaware limited liability
company (the .LLC.) which is wholly-owned by ENA. Upon the closing of the transaction,
described
herein, the LLC will be a party to a Turbine Contract (as defined herein) pertaining
to the purchase of four LM 6000 Enhanced
Sprint dual-fuel combustion turbine generator sets (the .GE Equipment.).
                                                                Difference Text Area 110d
2. Transaction. The parties agree to jointly engage in the transaction more particularly
described in this Agreement (collectively, the ["Transaction".]) The Transaction shall close on a
date mutually
agreeable to the Parties at least five (5), but no later than ten (10), business days
following the funding of the
Escrow Account as set forth in Section 4. Upon the closing of the Transaction, the
following events shall occur, each being a condition precedent to the others
and each being deemed to have occurred

FIG. 1B

First Panel 102

Second Panel 104   View 100c

Compare #261894.1 near duplicates  [Return to review window]
27 near duplicates with 32 total difference areas
Selected difference area  [Difference area 1 of 32 ▶]

☐ Text variations ▼                                   4 of 4 ◇

☐ 3-06-2001
   12 documents ▲

☐ 4-09-2001
   9 documents ▲

☐ 3-08-2002
   4 documents ▲

☐ 5-08-2001 — Text Variation 112d
   2 documents ▲

[Modify 0 of 27 documents]

Contextual difference areas  [#261894.1 (Reference document) ▶]
                             Difference Text Area 110a
DRAFT
[4-09-2001] FOR DISCUSSION PURPOSES ONLY
          MARCH ____, 2002  Delta Power Company LLC 89
Delta Power Company LLC 89 Headquarters Plaza North Tower, 14th Floor
Morristown, New Jersey 07960 Re: Newco,                    LLC
Letter Agreement for Purchase of Membership Interests
Gentlemen:
This letter (the .Agreement.), when executed by the parties, Enron North America Corp.
(.ENA.)
and Delta Power Company LLC (.Delta.)              (collectively, the .Parties. and
individually, a (.Party.), shall set
forth the agreement between the Parties.
1.
Purchase of Membership Interests. ENA is interested in causing the LLC to issue and
sell, and Delta is interested in acquiring, membership interest in [Newco,]
LLC, a Delaware limited liability
company (the .LLC.) which is wholly-owned by ENA. Upon the closing of the transaction,
described
herein, the LLC will be a party to a Turbine Contract (as defined herein) pertaining
to the purchase of four [LM 6000 Enhanced
Sprint dual-fuel] combustion turbine generator ____ sets (the .GE Equipment.).
2.
Transaction. The parties agree to jointly engage in the transaction more particularly
described in this Agreement (collectively, the ["Transaction."]
                                            The Transaction shall close on a
date mutually
agreeable to the Parties at [least five (5), but no] later than ten (10), business days
following the funding of the
Escrow Account as set forth in Section 4. Upon the closing of the Transaction, the
following events shall occure, each being a condition precedent to have occurred
and each being deemed to have occurred

View 100d

Second Panel 104

Compare #261894.1 near duplicates [Return to review window]
27 near duplicates with 32 total difference areas Selected difference area [Difference area 1 of 32 ▼]

☑ Text variations ▼                                    1 of 4 ◇

☑ 3-06-2001 ▬▬▬ Text Variation 112a
   12 documents ▲

☑ 4-09-2001 ▬▬▬ Text Variation 112b
   9 documents ▲

☑ 3-08-2002 ▬▬▬ Text Variation 112c
   4 documents ▲

☐ 5-08-2001 ▬▬▬ Text Variation 112d
   2 documents ▲

[Modify 0 of 27 documents] — Button 114

First Panel 102

Contextual difference areas  [#261894.1 (Reference document) ▼]

┌─ Difference Text Area 110a
DRAFT                         │
[4-09-2001] FOR DISCUSSION PURPOSES ONLY
            MARCH ____, 2002 [Delta Power Company LLC 89]
Delta Power Company LLC 89 Headquarters Plaza North Tower, 14th Floor
Morristown, New Jersey 07960 Re: Newco,                         [LLC]
Letter Agreement for Purchase of Membership Interests
Gentlemen:
This letter (the .Agreement.), when executed by the parties, Enron North America Corp.
(.ENA.)
and Delta Power Company LLC (.Delta.)        [    ] (collectively, the .Parties. and
individually, a (.Party.), shall set
forth the agreement between the Parties.
1.
Purchase of Membership Interests. ENA is interested in causing the LLC to issue and
sell, and Delta is interested in acquiring, membership interest in [Newco,]
LLC, a Delaware limited liability
company (the .LLC.) which is wholly-owned by ENA. Upon the closing of the transaction,
described
herein, the LLC will be a party to a Turbine Contract (as defined herein) pertaining
to the purchase of four [LM 6000 Enhanced]
[Sprint dual-fuel] combustion turbine generator [    ] sets (the .GE Equipment.).
2.
Transaction. The parties agree to jointly engage in the transaction more particularly
described in this Agreement (collectively, the ["Transaction".)]
                                                   [The Transaction shall close on a]
date mutually
agreeable to the Parties at [least five (5), but no] later than ten (10), business days
following the funding of the
Escrow Account as set forth in Section 4. Upon the closing of the Transaction, the
following events shall occur, each being a condition precedent to the others
and each being deemed to have occurred

View 100e

First Panel 102

Compare #261894.1 near duplicates [Return to review window]
27 near duplicates with 32 total difference areas Selected difference area [Difference area 1 of 32 ▼]

☑ Text variations ▼                                    2 of 4 ◇

☐ 3-06-2001
   12 documents ▶

☑ 4-09-2001
   9 documents ▶

Contextual difference areas [#261894.1 (Reference document) ▼]

╭─ Difference Text Area 110a
DRAFT [4-09-2001] FOR DISCUSSION PURPOSES ONLY
              MARCH ___, 2002 Delta Power Company LLC 89
Delta Power Company LLC 89 Headquarters Plaza North Tower, 14th Floor
Morristown, New Jersey 07960 Re: Newco, LLC
Letter Agreement for Purchase of Membership Interests
Gentlemen:
This letter (the .Agreement.), when executed by the parties, Enron North America Corp.
(.ENA.).

[Cancel] [Apply]
Button 122

Third Panel 116

Add: [:Hot x:] ← Tags 124
Remove: *To batch remove something, click it twice in the panel below* | View conditional rules
Filter [Codes, categories, and more]

Rating  [:Hot x:]  [Warm]  [Cold]  [Unrated]

← Options 120
+ Beta2 ⊕  [Uno]  [Dos]  [Tres]
+ Colors   [blue] [green] [Yellow]
Category   [1]    [2]    [Button] [Frog] [Not Privileged]
Confidentiality [Confidential] [Highly Confidential]

← Categories 118

FIG. 1E

First Panel 102

Contextual difference areas  #261894.1 (Reference document) ▼   Difference Text Area 110b DRAFT
4-09-2001 FOR DISCUSSION PURPOSES ONLY
MARCH ____, 2002 [Delta Affiliate], LLC 89 Headquarters Plaza
North Tower, 14th Floor Morristown, New Jersey 07960 Re: Newco, ............ LLC Letter Agreement for Purchase of Membership Interests
Gentlemen:
This letter (the .Agreement.), when executed by the parties, Enron North America Corp. (.ENA.)
and Delta Power Company LLC (.Delta.)                      (collectively, the .Parties. and
individually, a (.Party.), shall set
forth the agreement between the Parties.
1.
Purchase o12f Membership Interests. ENA is interested in causing the LLC to issue and
sell, and Delta     is interested in acquiring, membership interest in Newco,
LLC, a Delaware limited liability
company (the .LLC.) which is wholly-owned by ENA. Upon the closing of the transaction,
described
herein, the LLC will be a party to a Turbine Contract (as defined herein) pertaining
to the purchase of four LM 6000 Enhanced
Sprint dual-fuel combustion turbine generator ____ sets (the .GE Equipment.).
2.
Transaction. The parties agree to jointly engage in the transaction more particularly
described in this Agreement (collectively, the "Transaction").
            The Transaction shall close on a
date mutually
agreeable to the Parties at least five (5), but no later than ten (10), business days
following the funding of the
Escrow Account as set forth in Section 4. Upon the closing of the Transaction, the
following events shall occure, each being a condition precedent to the others
and each being deemed to have occurred

Second Panel 104    View 100f

Compare #261894.1 near duplicates   Return to review window
27 near duplicates with 32 total difference areas Selected difference area   Difference area 1 of 32 ▼         2 of 4 ◇ ▷

☐ Text variations ▼

☑ Delta Power Company LLC Delta Power Company Headqarters
Plaza North Tower, 14th Floor Morristown, New Jersey 07960
Rw: Newco
8 documents ▲ ———— Text Variation 126a ☐ Panda Energy ________ Power Company LLLC
                 89 Headquarters Plaza
                 North Tower, 14th Floor Re:
     Marristown, New Jersey 07960 Re: Spawn Energy
4 documents ▲

☑ Delta Power Company LLC 89 Headqarters Plaza North Tower,
14th Floor Morristown, New Jersey 07960 Re: Spawn Energy
4 documents ▲ ———— Text Variation 126b ☑ [Delta Affiliate], LLC 89 Headquarters Plaza North Tower,
14th Floor Morristown, New Jersey 07960 Re: Newco,
3 documents ▲ ———— Text Variation 126c ☐ Panda Energy Energy International, Inc 4100 Spring Valley Suite
100 Dallas, Texas 775244 Re: Energy Newco,
2 documents ▲ ———— Button 114

Modify 0 of 27 documents

DOCUMENT DIFFERENCE VIEWING AND NAVIGATION

FIELD OF THE DISCLOSURE

The present disclosure relates to methods, computing systems, and storage media for document difference viewing and navigation.

BACKGROUND

In the context of legal proceedings, for example, document review (or "doc" review) describes a process by which a party to a case analyzes documents in their possession (e.g., possessed before the case or obtained through discovery) to determine which documents are relevant to the case or otherwise sensitive (e.g., privileged). Attorneys often perform document review for their clients. Many types of cases, such as litigation, mergers and acquisitions, and government and internal investigations or audits, can require thousands or millions of documents to be reviewed. Document review often also involves comparison of these documents. Furthermore, in addition to document review, anything where large volumes of documents are compared, such as plagiarism checkers, are also relevant.

In a large set of documents under review, often many will be "near duplicates." For example, there can be small accidental differences due to mistakes made performing optical character recognition (OCR) of scanned images, there can be many emails that were all produced by the same bulk-email template, or there can be minor revisions or markups of other documents. Human reviewers (e.g., attorneys) can save a lot of review time if they can avoid reviewing and comparing the same content repeatedly. Some applications attempt to address this by allowing two documents to be reviewed at the same time to see their differences. For example, a pair of documents can be displayed side-by-side with differences highlighted or in markup. This allows the reviewer to identify differences from a reference document more quickly than when reading a document in isolation, but the reviewer must still step through each document one at a time to compare it with a reference document.

Conventional systems typically do not provide for the comparison and viewing the differences between many documents, for example, four or more documents, dozens, hundreds, or even thousands of documents. Furthermore, the conventional method of comparison of documents on a one-to-one basis wastes significant computing resources such as processing power when larger amounts of documents are needed to be compared.

SUMMARY

One aspect of the present disclosure relates to a method in a data processing system for document difference viewing and navigation. The method includes receiving a set of documents having four or more documents, each document within the set of documents containing textual information. The method includes reading text from documents in the set of documents. The method includes identifying, among different documents in the set of documents, shared text and differences by location within the shared text. The method includes sorting the documents in the set of documents into groups of different text variations, wherein the sorting is based on the differences by location within the shared text. The method includes generating a shared difference document, the shared difference document being configured to display areas of difference between sections of the shared text among the different documents in the set of documents.

Another aspect of the present disclosure relates to a computing system configured for document difference viewing and navigation. The computing system includes a memory having executable instructions and one or more hardware processors configured to execute the instructions. The processor(s) execute the instructions to receive a set of documents, a given document within the set of documents containing textual information. The processor(s) execute the instructions to read text from documents in the set of documents. The processor(s) execute the instructions to identify, among different documents in the set of documents, shared text and differences by location within the shared text. The processor(s) execute the instructions to sort the documents in the set of documents into groups of different text versions. The sorting is based on the differences by location within the shared text. The processor(s) execute the instructions to generate a shared difference document, the shared difference document being configured to display areas of difference between sections of the shared text among the different documents in the set of documents.

Yet another aspect of the present disclosure relates to a method for providing a user interface configured for document difference viewing and navigation. The method includes displaying a shared difference document in a first panel of a user interface, the shared difference document being configured to display areas of difference between sections of shared text among different documents in a set of documents. The shared difference document includes a graphical representation of a document with the shared text shown as demarcated from areas of difference. The shared difference document includes a shared text area representing shared text and difference text areas at difference locations filled with text from a particular document. The method includes, in response to receiving a user selection of a given area of difference, displaying, in a second panel of the user interface, the text variations and a list of documents containing one or more corresponding text variations. The documents in the set of documents are sorted into groups of different text versions based on the differences by location within the shared text identified among different documents in the set of documents. The method includes, in response to receiving a user selection of a given text variation within the given area of difference, modifying the given text variation within documents containing the given text variation.

BRIEF DESCRIPTION OF THE DRAWINGS

FIG. 1A illustrates an example view of a user interface configured for document difference viewing and navigation showing the selection of a first group of documents with the same text variation, in accordance with one or more implementations.

FIG. 1C illustrates an exemplary view of a user interface configured for document difference viewing and navigation showing the selection of a third group of documents with the same text variation, in accordance with one or more implementations.

FIG. 1D illustrates an exemplary view of a user interface configured for document difference viewing and navigation showing the selection of all groups of documents, each with different text variations at the same document location, in accordance with one or more implementations.

FIG. 1F illustrates an exemplary view of a user interface configured for document difference viewing and navigation showing the selection of different groups of documents having near-duplicate text variations at the same document location, in accordance with one or more implementations.

DETAILED DESCRIPTION

Implementations described herein provide document difference viewing and navigation of many documents, for example, to speed up document comparison, for example, for document review processes. They provide for the easy viewing of the differences between the documents, for example, between many documents (e.g., four or more, dozens, hundreds, or even thousands of documents). For example, when presented with a collection of documents that are similar or very similar but not exactly the same, some implementations allow a user to see how they differ to understand and determine the relevance of documents within the collection. Some implementations facilitate a review of an entire near duplicate group in one pass without reading any content twice. The system allows user to apply review work (e.g., adding labels such as "confidential") to the entire near duplicate group with a single action or apply review work to documents having a particular variation of a text difference. Some implementations provide a convenient user interface configured to allow the user to select a subset of documents under review which share an important, relevant or desired similarity in their text. Some implementations also show differences in metadata of documents across many documents. Metadata for an email document, for example, includes the "to:" "from:" "cc:" and "bcc:" fields, among other things.

The disclosed system(s) and method(s) save significant computing resources, such as processing power and memory usage by cutting down on the need to do document comparison for large sets of documents one-by-one. The individual one-by-one comparison of a large set of documents for a conventional viewer takes significantly more computing resources and processing power due to the inefficient comparison process in contrast to method and systems disclosed herein. These systems also solve the technical problem associated with determining and displaying differences among a set of electronic documents in a way that scales to accommodate large sets (e.g., dozens, hundreds, or even thousands of documents). Additionally, pre-processing document differences in bulk at the time of upload (and not upon request) saves computing resources and processor usage and power by avoiding document difference processing every time a document is requested to be processed by a user. Furthermore, the mass application of labels (e.g., "confidential") to multiple documents having selected variations of differences at once saves significant processor resources and scales the amount of work done in a single action. As such, the disclosed subject technology provides improvements to the functioning of the computer itself because it improves processing and efficiency in document difference viewing and navigation for sets of documents.

FIG. 1A illustrates an example view 100a of a user interface configured for document difference viewing and navigation showing the selection of a first group of documents with the same text variation, in accordance with one or more implementations. In one implementation, the view 100 is a webpage, application screen or other suitable display. As shown in FIG. 1A, the user interface includes one or more of a first panel 102, a second panel 104, and/or other components.

The first panel 102 includes a shared difference document 106. The shared difference document 106 includes a visual representation of both the shared text that is common to all of the documents as well as the areas of the documents that differ from one another within a set of documents (e.g., a set of 32 (or any other number) documents under review). Such documents include electronic copies of documents containing textual information (e.g., ordinary document text and/or document metadata) and/or other information (e.g., images and/or other embedded information).

The shared difference document 106 includes a shared text area 108, one or more difference text areas (e.g., difference text area 110a, 110b, 110c, and 110d), and other components. A size, shape, and/or dimension of a shared text area 108 is fixed or static, in some implementations. The shared text area 108 visually conveys text that is shared among the individual documents of the set of documents. That is, the shared text area 108 encompasses one or more spans of text that are identical and appear at the same position in the documents within the set. The shared text area 108 represents a portion of text shared between each of the documents within the set. The shared text area 108 maintains its form regardless of any variable information displayed in the difference text areas 110).

Individual difference text areas (e.g., difference text area 110a) represents areas of text in the set of documents that vary between at least two individual documents. When a user selects difference text area 110a, for example, the system displays text that occupies it in various text versions of the document in the second panel 104, as indicated by text variations 112a, 112b, 112c, and 112d. The shared difference document 106 and combination of the shared text area 108 and difference text areas 110a-d may be conceptually thought of as a rigid static stencil (shared text area 108) with various difference text areas as the holes in the stencil.

A given text variation (e.g., text variation 112b) represents text that is not found in all of the documents in the set of documents. As shown in FIG. 1A, nine documents contain the text "4-09-2001" (i.e., text variation 112b) at the position of the difference text area 110a. The other text variations 112a, 112c and 122d contain different text at the same position in the document.

Figure 1B:
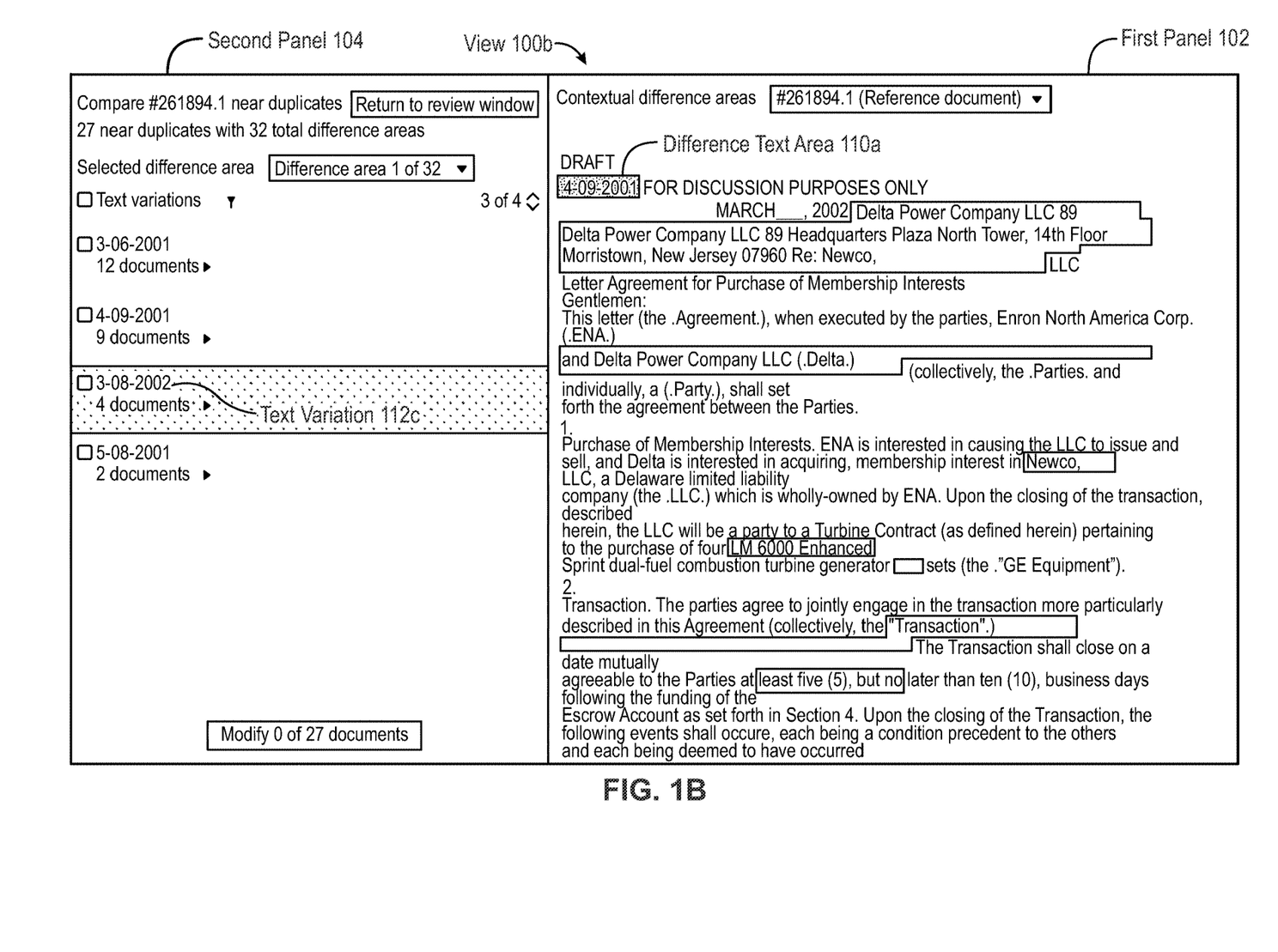
FIG. 1B illustrates an exemplary view of a user interface configured for document difference viewing and navigation showing the selection of a second group of documents with the same text variation, in accordance with one or more implementations.

FIG. 1B illustrates an exemplary view 100b of a user interface configured for document difference viewing and navigation showing the selection of a second group of documents with the same text variation, in accordance with one or more implementations. As shown in FIG. 1B, when a user selects text variation 112c, the text from four documents (i.e., "3-08-2002") populates difference text area 110a.

FIG. 1C illustrates an exemplary view of a user interface configured for document difference viewing and navigation showing the selection of a third group of documents with the same text variation, in accordance with one or more implementations. As shown in FIG. 1C, when a user selects text variation 112c, the text from two documents (i.e., "5-08-2001") populates difference text area 110a. Individual documents associated with a given text variation are accessible (e.g., through a drop-down menu), in some implementations. As shown, difference text areas 110a-d each show an area of text that differs between documents (as opposed to the shared text area 108 which is the same between the documents,) and the second panel 104 shows how that area differs between different groups of documents.

FIG. 1D illustrates an exemplary view 100d of a user interface configured for document difference viewing and navigation showing the selection of all groups of documents, each with different text variations at the same document location, in accordance with one or more implementations. According to some implementations, as shown in view 100d of FIG. 1D, multiple text variations (e.g., text variations 112a, 112b, 112c, and 112d) can be selected (e.g., by clicking check boxes). In some implementations, users select text variations to be modified and effectuate modifications to selected text variations by selecting (e.g., clicking or tapping) a button 114.

Figure 1E:
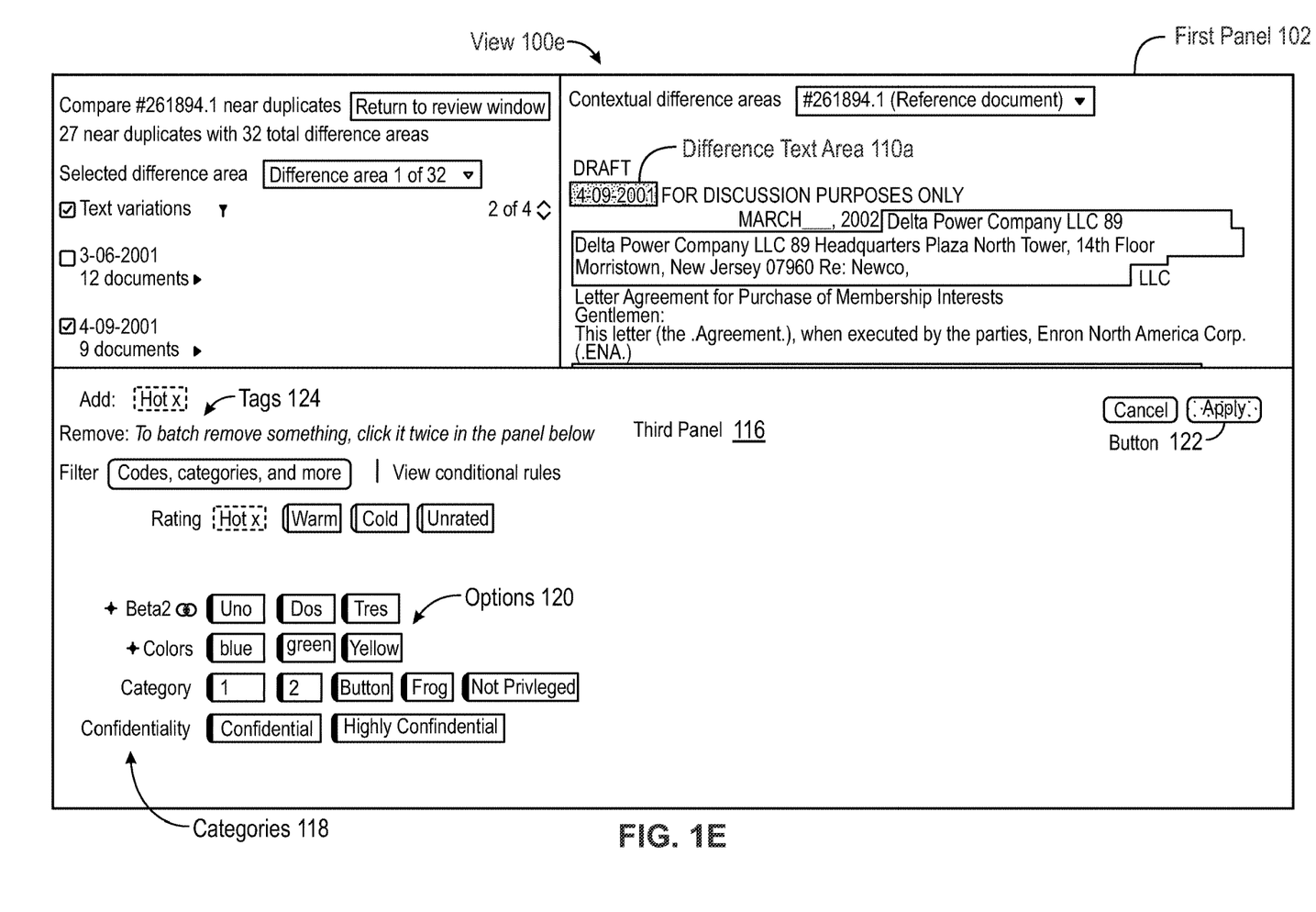
FIG. 1E illustrates an exemplary view of a user interface configured for document difference viewing and navigation showing modification of the groups of documents selected in FIG. 1D, in accordance with one or more implementations.

FIG. 1E illustrates an exemplary view 100e of a user interface configured for document difference viewing and navigation showing modification of the groups of documents selected in FIG. 1D, in accordance with one or more implementations. In response to a request to modify one or more text variations (e.g., through button 114 in FIG. 1D), the system displays a third panel 116, as shown in view 100e of FIG. 1E. The third panel 116 facilitates modifying documents associated with particular text variations. Modifying a document includes adding tags to the document and/or associating other information with the document. The third panel 116 includes one or more of categories 118, options 120, button 122, tags 124, and/or other components. The categories 118 include different types of tags. Each category includes one or more options 120. A user selects one or more options 120 from one or more categories 118, and then select (e.g., click or tap) a button 122. The system displays selected options through tags 124, which are associated with the documents being modified. For example, if a user selects text variations 112a and 112b and apply the tag "hot," the system labels all of the documents in the text variations 112a and 112b with the label "hot."

FIG. 1F illustrates an exemplary view 100f of a user interface configured for document difference viewing and navigation showing the selection of different groups of documents having near-duplicate text variations at the same document location, in accordance with one or more implementations. In the view 100f in FIG. 1F, text from the three documents associated with a text variation 126c (i.e., "[Delta Affiliate], LLC . . . ") populates the difference text area 110b in the first panel 102. By selecting the text variation 126a, the text variation 126b, and the text variation 126c, the system modifies all documents having these near-duplicate text variations together.

According to some implementations, the system reads a set of documents at once and stores shared text across all documents, while simultaneously storing differences by location within the shared text, sorted by different text versions. The system stores any line-break or contextual information corresponding to locations in the text. In some implementations, processed data such as one or more of the shared text across all documents, differences by location within the shared text, and/or any line-break or contextual information corresponding to locations in the text is generated and/or stored in conjunction with forming document groups that share the same and/or similar differences at a given location. When a user requests a view of the differences, the system loads the processed data, which prevents or mitigates wait times for processing. The system displays a shared difference document 106 showing differences between sections of shared text. When displaying each difference area, the maximum dimensions of all text variations are determined and used to size the difference area so it accommodates possible variation sizes. For each difference area, in response to a user input (e.g., a click or tap), the system displays all text variations in another panel along with a list of documents containing that text variation. Text variations can be selected to modify groups of documents containing that variation. Users can select multiple text variations to modify all their groups at once (e.g., applying tags/labels).

Figure 2:
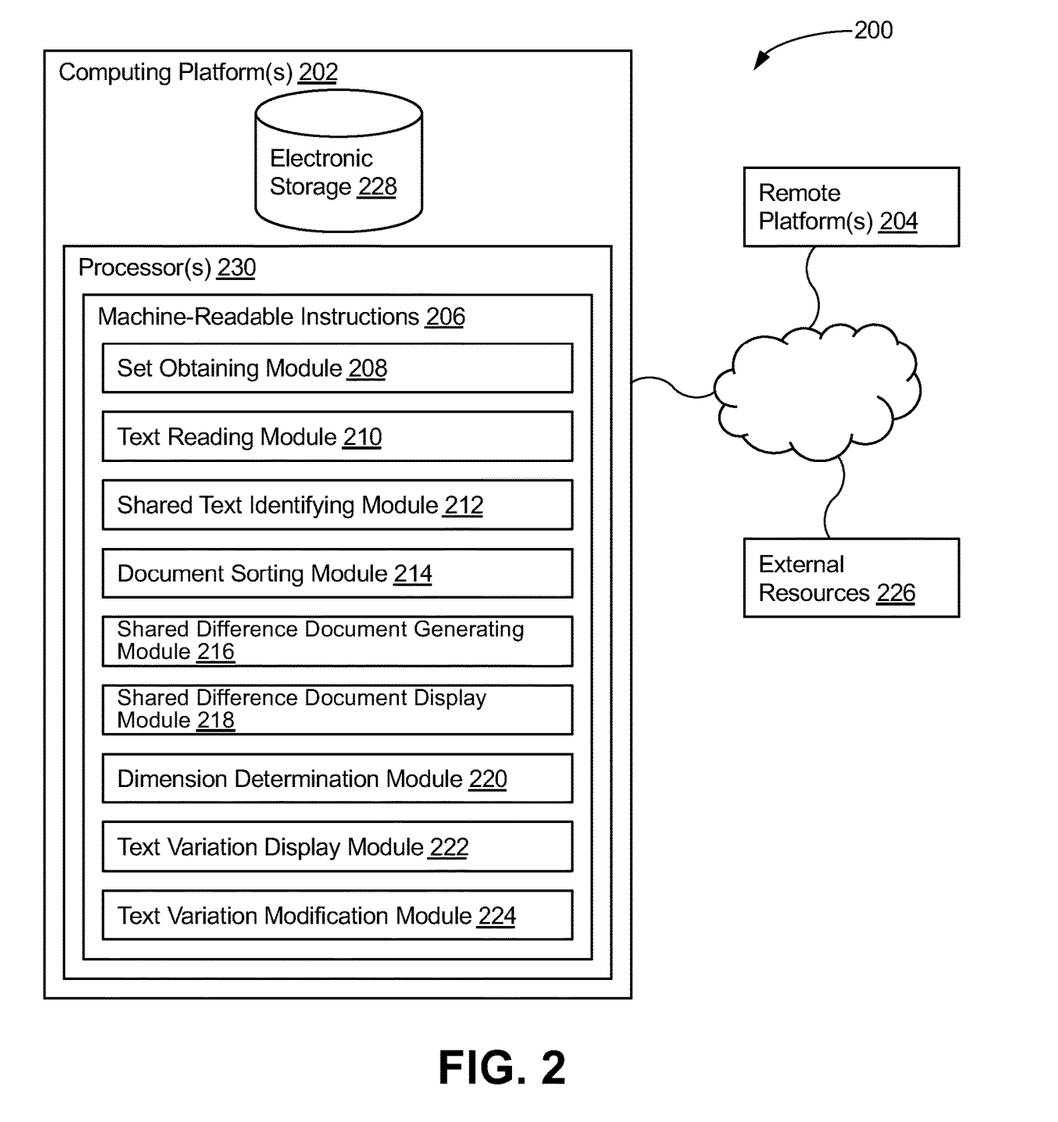
FIG. 2 illustrates a system configured for document difference viewing and navigation, in accordance with one or more implementations.

FIG. 2 illustrates a system 200 configured for document difference viewing and navigation, in accordance with one or more implementations. In some implementations, system 200 includes one or more computing platforms 202. Computing platform(s) 202 communicate with one or more remote platforms 204 according to a client/server architecture, a peer-to-peer architecture, and/or other architectures. Remote platform(s) 204 communicate with other remote platforms via computing platform(s) 202 and/or according to a client/server architecture, a peer-to-peer architecture, and/ or other architectures. Users can access system 200 via remote platform(s) 204.

Machine-readable instructions 206 configure computing platform(s) 202. Machine-readable instructions 206 includes one or more instruction modules. The instruction modules include computer program modules. The instruction modules include one or more of set receiving module 208, text reading module 210, shared text identifying module 212, document sorting module 214, shared difference document generating module 216, shared difference document display module 218, dimension determination module 220, text variation display module 222, text variation modification module 224, and/or other instruction modules. These modules can be implemented as software, hardware, or a combination of the two.

Set receiving module 208 receives or obtains a set of documents, a given document within the set of documents containing textual information. In one implementation, the set of documents is subject to a document review process in document review software. The textual information includes one or both of ordinary document text and/or document metadata. The ordinary document text includes text that is visible if the given document were printed on paper. The metadata includes text about the given document that is embedded in an electronic version of the given document but not visible if the given document were printed on paper.

Text reading module 210 reads text from documents in the set of documents. Reading the text from the documents in the set of documents can be performed simultaneously or contemporaneously. Reading the text from the documents includes performing computerized natural language processing of the text.

Shared text identifying module 212 identifies, among different documents in the set of documents, shared text (e.g., shared text area 108) and differences by location within the shared text (e.g., different text area 110a-d). In one implementation, the shared text includes a span of text that appears at a same position or a similar position (e.g., within a given number of words or spaces) in the text of all of the documents in the set of documents. For example, differences include spans of text located between locations of shared text, a given difference including different text between at least two documents in the set of documents. The system stores line-break or contextual information corresponding to locations in the shared text.

Document sorting module 214 sorts the documents in the set of documents into groups of different text versions. The sorting is based on the differences by location within the shared text. In some implementations, a given text version includes duplicate documents.

Shared difference document generating module 216 generates a shared difference document 106. The shared difference document 106 visually convey areas of difference between sections of the shared text among the different documents in the set of documents. The shared difference document 106 includes a graphical representation of a document with the shared text shown as demarcated from areas of difference. The shared difference document 106 includes a shared text area representing shared text and difference text areas at difference locations filled with text from a particular document. The maximum length of text variations determines size of the difference text areas. The shared text area 108 and difference text areas visually anchor context across navigation of the set of documents through the second panel 104.

Shared difference document display module 218 displays the shared difference document 106 in a first panel 102 of a user interface. The shared difference document 106 in the first panel 102 facilitates navigation within the shared text.

Dimension determination module 220 determines, for individual areas of difference, a maximum length of text variations in that individual area of difference. In some implementations, the system determines the maximum dimension of text variations for all possible variation sizes. In some implementations, the difference text areas are each large enough to accommodate a largest text variation at respective locations of individual difference text areas. In other words, if text variations corresponding to a given difference text area have lengths ranging from 12 to 56 characters, the given difference text area would have a that accommodates 56 characters. In some implementations, a given difference text area having an area that is larger than a threshold size includes an expand/collapse widget configured to facilitate hiding empty space without losing context of the shared text area 108.

Text variation display module 222 displays in a second panel 104 of the user interface, in response to receiving a user selection of a given area of difference, the text variations 112 and a list of documents containing one or more corresponding text variations. The text variations 112*a-d* and a list of documents containing one or more corresponding text variations in the second panel 104 facilitates navigation among the set of documents. The system groups subsets of the set of documents together in the second panel 104 based on sharing a same content in a particular difference text area 110*a-d* or difference location. In one implementation, the system displays a given difference in the second panel 104 with a same shape as a corresponding difference text area 110 in the shared difference document 106 displayed in the first panel 102. In some implementations, a first panel width and a second panel width are constrained to be one or more of equal, substantially equal, a fixed width ratio, and/or other widths.

Text variation modification module 224 modifies, in response to receiving a user selection of a given text variation within the given area of difference, the given text variation within documents containing the given text variation. Modifying the given text variation includes applying one or both of a tag or a label to the given text variation.

In some implementations, computing platform(s) 202, remote platform(s) 204, and/or external resources 226 can be operatively linked via one or more electronic communication links. For example, such electronic communication links can be established, at least in part, via a network such as the Internet and/or other networks. However, computing platform(s) 202, remote platform(s) 204, and/or external resources 226 can be operatively linked via some other communication media.

A given remote platform 204 includes one or more processors 230 configured to execute computer program modules. The computer program modules enable a user associated with the given remote platform 204 to interface with system 200 and/or external resources 226, and/or provide other functionality attributed herein to remote platform(s) 204. For example, a given remote platform 204 and/or a given computing platform 202 includes one or more of a server, a desktop computer, a laptop computer, a handheld computer, a tablet computing platform, a smartphone, a gaming console, and/or other computing platforms.

External resources 226 includes sources of information outside of system 200, external entities participating with system 200, and/or other resources. In some implementations, some or all of the functionality attributed herein to external resources 226 can be provided by resources included in system 200.

Computing platform(s) 202 includes electronic storage 228, one or more processors 230, and/or other components. Computing platform(s) 202 includes communication lines, or ports to enable the exchange of information with a network and/or other computing platforms. Computing platform(s) 202 includes a plurality of hardware, software, and/or firmware components operating together to provide the functionality attributed herein to computing platform(s) 202. For example, computing platform(s) 202 can be implemented by a cloud of computing platforms operating together as computing platform(s) 202.

Electronic storage 228 includes non-transitory storage media that electronically stores information. The electronic storage media of electronic storage 228 includes one or both of system storage that is provided integrally (i.e., substantially non-removable) with computing platform(s) 202 and/or removable storage that is removably connectable to computing platform(s) 202 via, for example, a port (e.g., a USB port, a firewire port, etc.) or a drive (e.g., a disk drive, etc.). Electronic storage 228 includes one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 228 includes one or more virtual storage resources (e.g., cloud storage, a virtual private network, and/or other virtual storage resources). Electronic storage 228 can store software algorithms, information determined by processor(s) 230, information received from computing platform(s) 202, information received from remote platform(s) 204, and/or other information that enables computing platform(s) 202 to function as described herein.

Processor(s) 230 provide information processing capabilities in computing platform(s) 202. As such, processor(s) 230 includes one or more of a digital processor, an analog processor, a digital circuit designed to process information, an analog circuit designed to process information, a state machine, and/or other mechanisms for electronically processing information. Although processor(s) 230 is shown in FIG. 2 as a single entity, this is for illustrative purposes only. In some implementations, processor(s) 230 includes a plurality of processing units. These processing units can be physically located within the same device, or processor(s) 230 can represent processing functionality of a plurality of devices operating in coordination. Processor(s) 230 execute modules 208, 210, 212, 214, 216, 218, 220, 222, and/or 224, and/or other modules. Processor(s) 230 execute modules 208, 210, 212, 214, 216, 218, 220, 222, and/or 224, and/or other modules by software; hardware; firmware; some combination of software, hardware, and/or firmware; and/or other mechanisms for configuring processing capabilities on processor(s) 230. As used herein, the term "module" can refer to any component or set of components that perform the functionality attributed to the module. This includes one or more physical processors during execution of processor readable instructions, the processor readable instructions, circuitry, hardware, storage media, or any other components.

It should be appreciated that although modules 208, 210, 212, 214, 216, 218, 220, 222, and/or 224 are illustrated in FIG. 2 as being implemented within a single processing unit, in implementations in which processor(s) 230 includes multiple processing units, one or more of modules 208, 210, 212, 214, 216, 218, 220, 222, and/or 224 can be implemented remotely from the other modules. The description of the functionality provided by the different modules 208, 210, 212, 214, 216, 218, 220, 222, and/or 224 described below is for illustrative purposes, and is not intended to be limiting, as any of modules 208, 210, 212, 214, 216, 218, 220, 222, and/or 224 can provide more or less functionality than is described. For example, one or more of modules 208, 210, 212, 214, 216, 218, 220, 222, and/or 224 can be eliminated, and some or all of its functionality can be provided by other ones of modules 208, 210, 212, 214, 216, 218, 220, 222, and/or 224. As another example, processor(s) 230 execute one or more additional modules that can perform some or all of the functionality attributed below to one of modules 208, 210, 212, 214, 216, 218, 220, 222, and/or 224.

Figure 3:
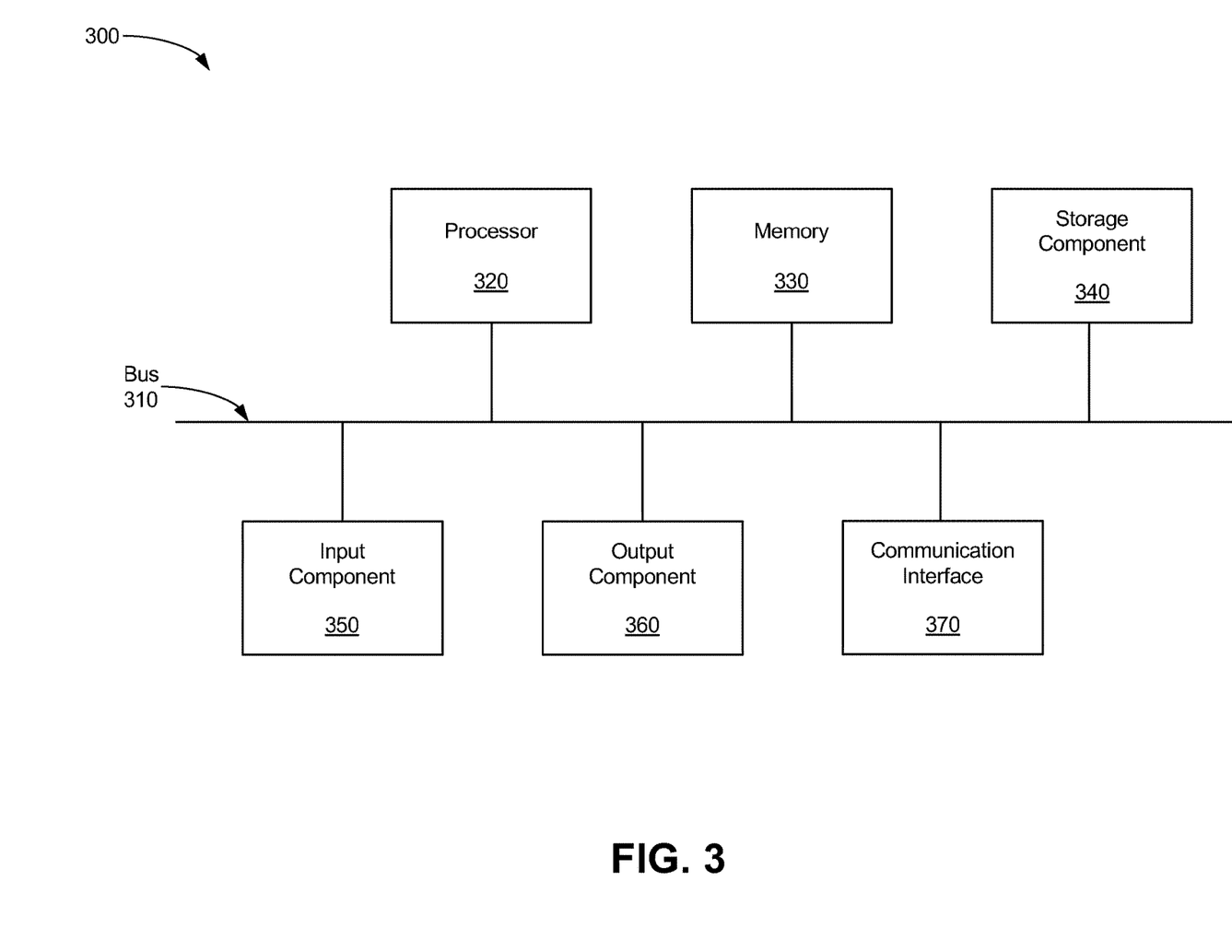
FIG. 3 illustrates an example computer system to implement the processes.

FIG. 3 is a diagram of example components of a device 300, which can correspond to one or more of computing platform(s) 202, remote platform(s) 204, and/or other device(s) described herein. In some implementations, computing platform(s) 202, remote platform(s) 204, and/or other devices described herein include one or more devices 300 and/or one or more components of device 300. As shown in FIG. 3, device 300 includes a bus 310, a processor 320, a memory 330, an input component 340, an output component 350, and a communication component 360.

Bus 310 includes one or more components that enable wired and/or wireless communication among the components of device 300. Bus 310 couples together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 includes random access memory (RAM), read only memory (ROM), a hard disk drive, and/or another type of memory (e.g., a flash memory, a magnetic memory, and/or an optical memory). Memory 330 includes internal memory (e.g., RAM, ROM, or a hard disk drive) and/or removable memory (e.g., removable via a universal serial bus connection). Memory 330 is a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 includes a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 includes a receiver, a transmitter, a transceiver, a modem, a network interface card, and/or an antenna.

Device 300 performs one or more operations or processes described herein. For example, a non-transitory computer-readable medium (e.g., memory 330) stores a set of instructions (e.g., one or more instructions or code) for execution by processor 320. Processor 320 can execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 can be configured to perform one or more operations or processes described herein. Thus, implementations described herein are not limited to any specific combination of hardware circuitry and software.

The number and arrangement of components shown in FIG. 3 are provided as an example. Device 300 includes additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
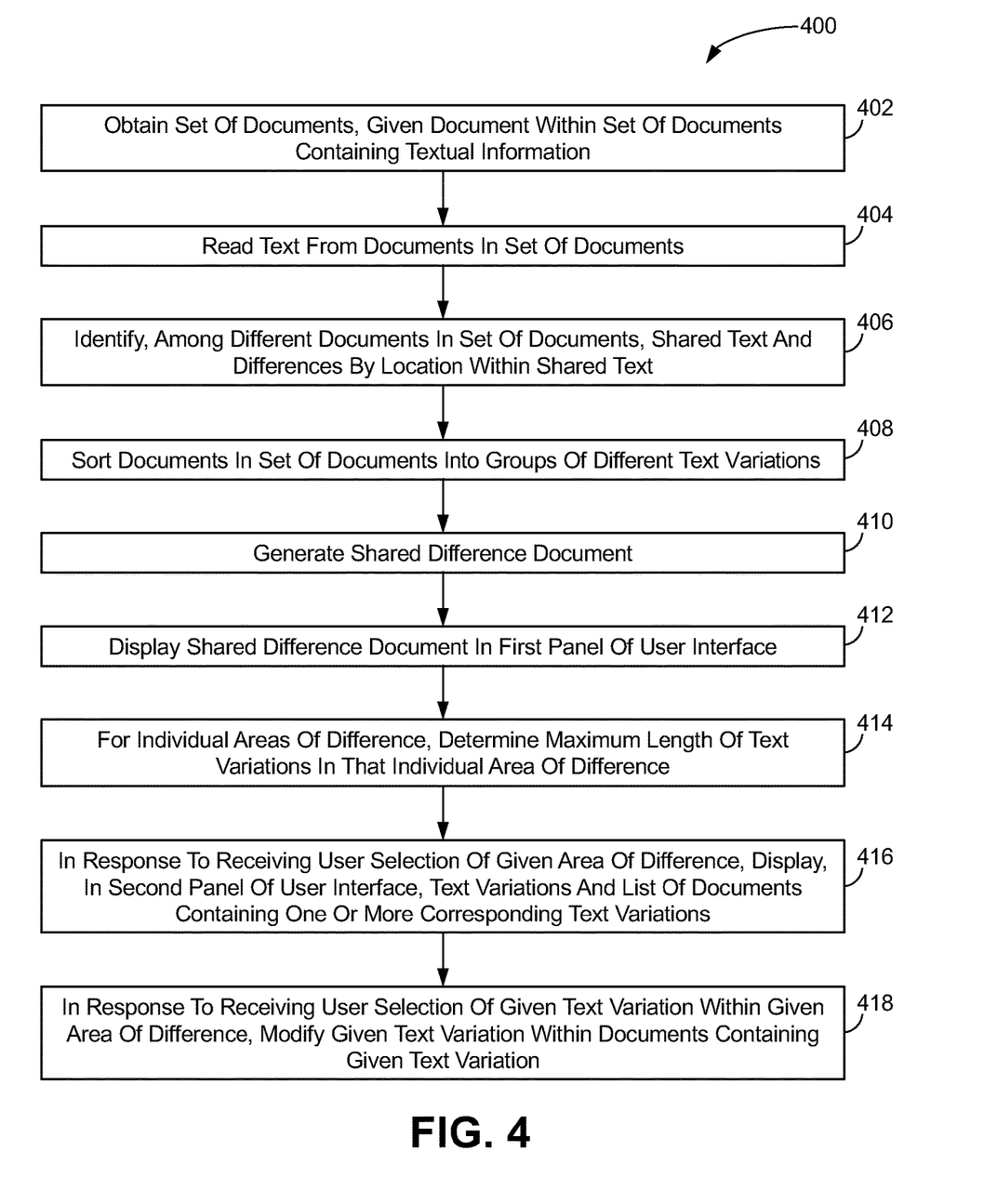
FIG. 4 is a flow chart of an exemplary method for document difference viewing and navigation, in accordance with one or more implementations.

FIG. 4 is a flow chart of an example method 400 for document difference viewing and navigation, in accordance with one or more implementations. In some implementations, one or more steps of FIG. 4 are performed by a device including one or more of computing platform(s) 202, remote platform(s) 204, and/or other devices. In some implementations, one or more steps of FIG. 4 are performed by another device or a group of devices separate from or including the device.

As shown at step 402, method 400 includes receiving a set of documents, a given document within the set of documents containing textual information. For example, the device performs receiving a set of documents, a given document within the set of documents containing textual information, as described above.

As shown at step 404, method 400 includes reading text from documents in the set of documents. For example, the device performs reading text from documents in the set of documents, as described above.

As shown at step 406, method 400 includes identifying, among different documents in the set of documents, shared text and differences by location within the shared text. For example, the device performs identifying, among different documents in the set of documents, shared text and differences by location within the shared text, as described above. In some implementations, the system identifies shared text through n-gram comparison between documents.

As shown at step 408, method 400 includes sorting the documents in the set of documents into groups of different text versions. The sorting is based on the differences by location within the shared text. For example, the device performs sorting the documents in the set of documents into groups of different text versions. The sorting is based on the differences by location within the shared text, as described above.

As shown at step 410, method 400 includes generating a shared difference document 106. The shared difference document 106 visually conveys areas of difference between sections of the shared text among the different documents in the set of documents. For example, the device performs generating a shared difference document 106. The shared difference document 106 visually conveys areas of difference between sections of the shared text among the different documents in the set of documents, as described above.

As shown at step 412, method 400 includes displaying the shared difference document 106 in a first panel 102 of a user interface. For example, the device performs displaying the shared difference document 106 in a first panel 102 of a user interface, as described above.

As shown at step 414, method 400 includes for individual areas of difference, determining a maximum length of text variations in that individual area of difference. For example, the device performs for individual areas of difference, determining a maximum length of text variations in that individual area of difference, as described above.

As shown at step 416, method 400 includes in response to receiving a user selection of a given area of difference, displaying, in a second panel 104 of the user interface, the text variations and a list of documents containing one or more corresponding text variations. For example, the device performs in response to receiving a user selection of a given area of difference, displaying, in a second panel 104 of the user interface, the text variations and a list of documents containing one or more corresponding text variations, as described above.

As shown at step 418, method 400 includes in response to receiving a user selection of a given text variation within the given area of difference, modifying the given text variation within documents containing the given text variation. For example, the device performs in response to receiving a user selection of a given text variation within the given area of difference, modifying the given text variation within documents containing the given text variation, as described above.

Method 400 includes additional implementations, such as any single implementation or any combination of implementations described herein and/or in connection with one or more other methods or processes described elsewhere herein.

Although FIG. 4 shows example blocks of method 400, in some implementations, method 400 includes additional blocks, fewer blocks, different blocks, or differently arranged blocks than those depicted in FIG. 4. Additionally, or alternatively, two or more of the blocks of method 400 can be performed in parallel.

The foregoing disclosure provides illustration and description but is not intended to be exhaustive or to limit the implementations to the precise form disclosed. Modifications and variations can be made in light of the above disclosure or can be acquired from practice of the implementations.

As used herein, the term "component" is intended to be broadly construed as hardware, firmware, or a combination of hardware and software.

It will be apparent that systems and/or methods described herein can be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code-it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features can be combined in ways not specifically recited in the claims and/or disclosed in the specification. Although each dependent claim listed below can directly depend on only one claim, the disclosure of various implementations includes each dependent claim in combination with every other claim in the claim set.

What is claimed is:

1. A method in a data processing system for document difference viewing and navigation, the method comprising:
   receiving, by a processor, a set of documents having four or more documents, wherein the set of documents comprises a plurality of versions of a common document, each version containing shared textual information;
   identifying, among different documents in the set of documents, one or more difference areas by location relative to shared text areas within each document of the set of documents;
   identifying, for each difference area and among the different documents, a plurality of variations of textual information for the difference area;
   sorting, by the processor and based on a particular variation in each document, the documents in the set of documents into groups of documents, wherein each group of documents comprises documents having a same variation of the textual information located at a given difference area;
   generating, by the processor, a shared difference document, the shared difference document being configured to display the one or more difference areas between sections of the shared text areas among the different documents in the set of documents, wherein the shared difference document includes a graphical representation of a document with the shared text areas shown as demarcated from the one or more difference areas, and wherein the shared difference document includes the shared text areas representing shared text and difference text areas at difference locations filled with text from the document;
   causing, in a first panel of a user interface, display of the shared difference document;

in response to a user selection of a difference area, causing, in a second panel of the user interface, display of one or more variations for the selected difference area, and a list of documents sharing a corresponding variation at the selected difference area; and in response to a user input comprising an instruction to apply a tag to a selected variation at the selected difference area, applying the tag to each document in the group of documents corresponding to the selected variation.

2. The method of claim 1, further comprising:
in response to a second user input comprising an instruction to apply a second tag to the selected difference area, applying the second tag to the selected difference area in all of the documents in the set of documents.

3. The method of claim 1, wherein the set of documents are subject to a document review process in document review software.

4. The method of claim 1, wherein the shared textual information includes one or both of ordinary document text and document metadata.

5. The method of claim 1, wherein the shared text areas include a span of text that appears at a same position in all of the documents in the set of documents.

6. The method of claim 1, wherein the one or more difference areas include spans of text located between locations of shared text areas, the selected difference area including different text between at least two documents in the set of documents.

7. The method of claim 1, further comprising:
for each difference area, determining a maximum length of the plurality of variations in an individual difference area; and
determining a size of the difference areas based on the maximum length of the plurality of variations.

8. The method of claim 1, wherein applying the tag comprises applying the tag to the set of documents.

9. The method of claim 1, wherein applying the tag comprises modifying a confidential label of the selected variation corresponding to the group of documents.

10. A computing system configured for document difference viewing and navigation, the computing system comprising:
one or more hardware processors; and
memory having executable instructions that, when executed by the one or more hardware processors, cause the computing system to:
obtain a set of documents having four or more documents, wherein the set of documents comprises a plurality of versions of a common document, each version containing shared textual information;
identify, among different documents in the set of documents, one or more difference areas by location relative to shared text areas within each document of the set of documents;
identifying, for each difference area and among the different documents, a plurality of variations of textual information for the difference area;
sort, based on a particular variation in each document, the documents in the set of documents into groups of documents, wherein each group of documents comprises documents having a same variation of the textual information located at a given difference area;
generate a shared difference document, the shared difference document being configured to visually convey the one or more difference areas between sections of the shared text areas among the different documents in the set of documents, wherein the shared difference document includes a graphical representation of a document with the shared text areas shown as demarcated from the one or more difference areas, and wherein the shared difference document includes the shared text areas representing shared text and difference text areas at difference locations filled with text from the document;
cause, in a first panel of a user interface, display of the shared difference document;
in response to a user selection of a difference area, cause, in a second panel of the user interface, display of one or more variations for the selected difference area, and a list of documents sharing a corresponding variation at the selected difference area; and
in response to user input comprising an instruction to apply a tag to a selected variation at the selected difference area, applying the tag to each document in the group of documents corresponding to the selected variation.

11. The computing system of claim 10, wherein the instructions, when executed by the one or more hardware processors, cause the computing system to:
in response to a second user input comprising an instruction to apply a second tag to the selected difference area, apply the second tag to the selected difference area in all of the documents in the set of documents.

12. The computing system of claim 10, a size of the difference areas is determined based on a maximum length of the plurality of variations.

13. The computing system of claim 10, wherein the set of documents are subject to a document review process in document review software.

14. The computing system of claim 10, wherein the shared textual information comprises ordinary document text and document metadata.

15. The computing system of claim 10, wherein the selected difference area includes different text between at least two documents in the set of documents.

16. The computing system of claim 10, wherein the instructions, when executed by the one or more hardware processors, cause the computing system to apply the tag by modifying a confidential label of the selected variation corresponding to the group of documents.

17. A method for providing a user interface configured for document difference viewing and navigation, the method comprising:
causing display of a shared difference document in a first panel of the user interface, the shared difference document being configured to display one or more difference areas between sections of shared text areas among different documents in a set of documents having four or more documents, wherein the set of documents comprises a plurality of versions of a common document, each version containing shared textual information, wherein the shared difference document includes a graphical representation of a document with the shared text areas shown as demarcated from of the one or more difference areas, wherein the one or more difference areas are identified by location relative to the shared text areas within each document of the set of documents, and wherein the shared difference document includes the shared text areas representing shared text and difference text areas at difference locations filled with text from a particular document;

in response to a user selection of a difference area, causing, in a second panel of the user interface, display of one or more variations of textual information for the selected difference area, and a list of documents sharing a corresponding variation at the selected difference area, wherein the documents in the set of documents are sorted into groups of documents based on a particular variation in each document, and wherein each group of documents comprises documents having a same variation of the textual information located at a given difference area; and in response to user input comprising an instruction to apply a tag based to a selected variation at the selected difference area, applying the tag to each document in the group of documents corresponding to the selected variation.

18. The method of claim 17, further comprising:
in response to a second user input comprising an instruction to apply a second tag to the selected difference area, applying the second tag to the selected difference area in all of the documents in the set of documents.

19. The method of claim 17, wherein the shared difference document in the first panel facilitates navigation within the shared text areas.

20. The method of claim 17, wherein the second panel is displayed with a same shape as a corresponding difference area in the shared text areas of the shared difference document displayed in the first panel.

\* \* \* \* \*